US012626109B2

(12) United States Patent
Han et al.

(10) Patent No.: US 12,626,109 B2
(45) Date of Patent: May 12, 2026

(54) EVENT-DRIVEN ACCELERATOR SUPPORTING INHIBITORY SPIKING NEURAL NETWORK

(71) Applicant: Electric Power Research Institute of State Grid Zhejiang Electric Power Co., LTD, Hangzhou (CN)

(72) Inventors: Rui Han, Hangzhou (CN); Donglian Qi, Hangzhou (CN); Yunfeng Yan, Hangzhou (CN); Chi Zhang, Hangzhou (CN); Yiming Zheng, Hangzhou (CN); Wang Luo, Hangzhou (CN); Ping Qian, Hangzhou (CN); Yong Zhang, Hangzhou (CN); Zheren Dai, Hangzhou (CN); Jun Chen, Hangzhou (CN); Chao Wang, Hangzhou (CN); Lei Gong, Hangzhou (CN); Huarong Xu, Hangzhou (CN)

(73) Assignee: Electric Power Research Institute of State Grid Zhejiang Electric Power Co., LTD, Hangzhou (CN)

( * ) Notice: Subject to any disclaimer, the term of this patent is extended or adjusted under 35 U.S.C. 154(b) by 955 days.

(21) Appl. No.: 17/878,096

(22) Filed: Aug. 1, 2022

(65) Prior Publication Data

US 2023/0214634 A1     Jul. 6, 2023

(30) Foreign Application Priority Data

Jan. 6, 2022     (CN) .......................... 202210010882.4

(51) Int. Cl.
*G06N 3/049* (2023.01)
*G06N 3/065* (2023.01)

(52) U.S. Cl.
CPC ............. *G06N 3/049* (2013.01); *G06N 3/065* (2023.01)

(58) Field of Classification Search
None
See application file for complete search history.

(56) References Cited

U.S. PATENT DOCUMENTS 10,671,912 B2 * 6/2020 Gottfried ................. G06N 3/09
2014/0081893 A1 * 3/2014 Modha ................... G06N 3/082
706/26

(Continued)

FOREIGN PATENT DOCUMENTS

CN 106845633 A 6/2017
CN 108985447 A 12/2018

OTHER PUBLICATIONS

Approximate Computing for Spiking Neural Networks Sanchari Sen et. cal (Year: 2017).*

(Continued)

*Primary Examiner* — Mandrita Brahmachari
(74) *Attorney, Agent, or Firm* — Bayramoglu Law Offices LLC

(57) ABSTRACT

A spiking neural network acceleration method includes constructing an approximate computation model according to a spiking neuron model and a spiking coding mode. The approximate computation model utilizes the characteristic that spiking frequency domain coding ignores the time semantics of a spiking sequence, compresses the distribution of spiking signals on a time step, and greatly reduces a spiking routing process and a subsequent neural computation process. The time-driven accelerator replans the computation process of the spiking neural network, sets a deduplication queue and a bitmap to solve the problem of spiking jitter, and realizes efficient support on the inhibitory spiking neural network.

8 Claims, 8 Drawing Sheets

(56)  References Cited

U.S. PATENT DOCUMENTS

| | | | | |
|---|---|---|---|---|
| 2017/0286827 A1* | 10/2017 | Chen | ..................... | G06N 3/063 |
| 2019/0180169 A1* | 6/2019 | Verzi | ..................... | G06N 3/049 |
| 2021/0232930 A1* | 7/2021 | Alakuijala | ............ | G06N 3/049 |
| 2021/0279559 A1 | 9/2021 | Nishi et al. | | |
| 2021/0357725 A1* | 11/2021 | Cherubini | ................ | G06N 3/09 |
| 2023/0206066 A1* | 6/2023 | McLelland | ............ | G06N 3/049 |
| | | | | 706/25 |
| 2024/0202506 A1* | 6/2024 | Detterer | ................ | G06N 3/063 |

OTHER PUBLICATIONS

FEAS: A Faster Event-driven Accelerator Supporting Inhibitory Spiking Neural Network Songsong Li et. al (Year: 2021).*
Spiking neurons can discover predictive features by aggregate-label learning Robert Gütig (Year: 2016).*
Minitaur, an Event-Driven FPGA-Based Spiking Network Accelerator Daniel Neil et. al. (Year: 2014).*
An Event-driven Spiking Neural Network Accelerator with On-chip Sparse Weight Kuang et. al. (Year: 2022).*

* cited by examiner

Artificial neuron

Spiking neuron

$$y = Activation\_Function(\Sigma w_i x_i)$$

$$V_t = V_{t-1} + leak + \Sigma w_i x_i$$

$$y = V_t \geq V_{thrd} ? 1 : 0$$

$$V_t = y V_{rst} + (1 - y) V_t$$

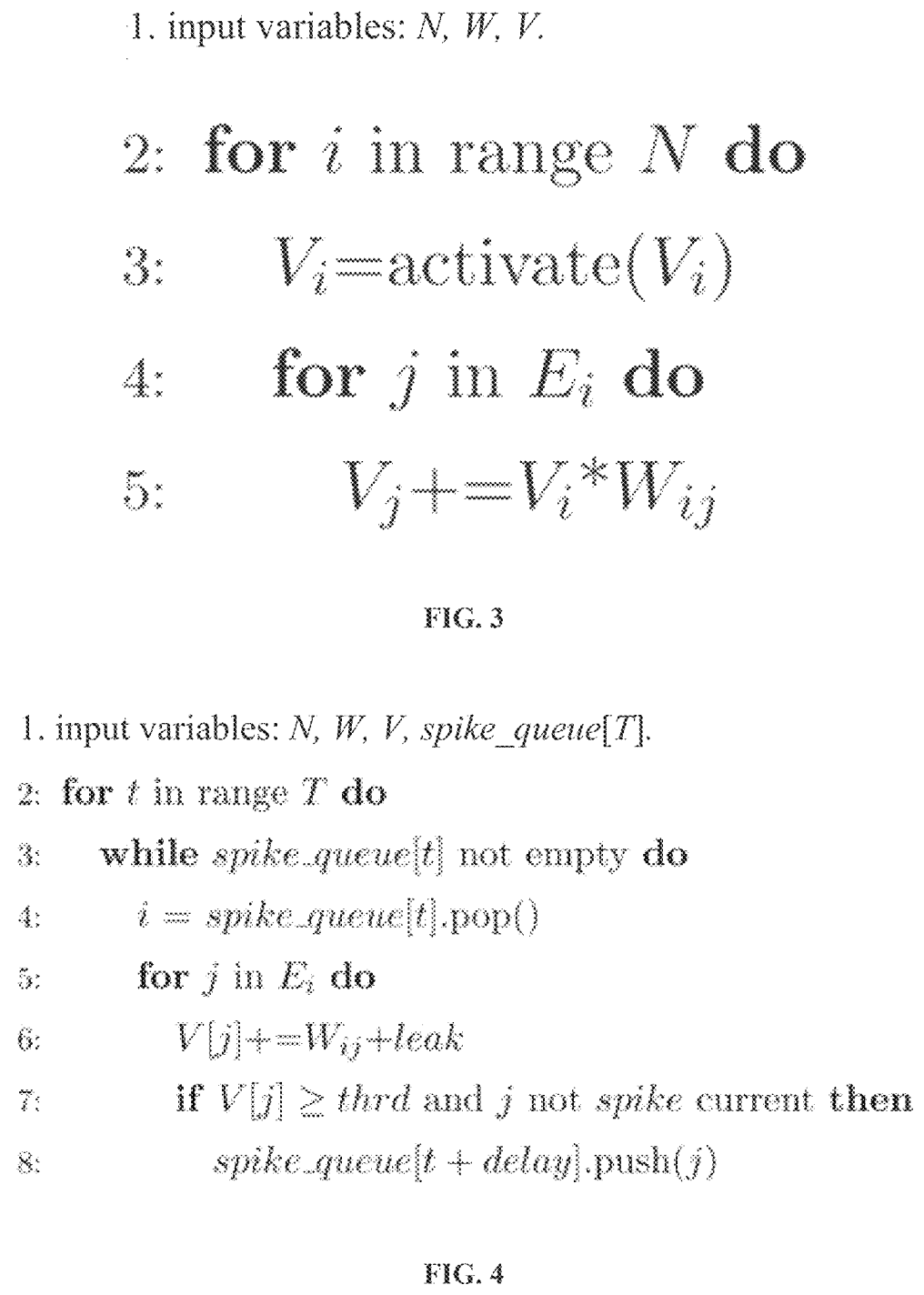

1. input variables: $N$, $W$, $V$.

2: for $i$ in range $N$ do

3: $V_i = \text{activate}(V_i)$

4: for $j$ in $E_i$ do

1. input variables: $N$, $W$, $V$, $spike\_queue[T]$.

2: for $t$ in range $T$ do

3: while $spike\_queue[t]$ not empty do

4: $i = spike\_queue[t].\text{pop}()$

5: for $j$ in $E_i$ do

6: $V[j] += W_{ij} + leak$

7: if $V[j] \geq thrd$ and $j$ not $spike$ current then

8: $spike\_queue[t + delay].\text{push}(j)$

FIG. 4

1. input variables: $N$, $W$, $V$, *spike_queue*.

2:  for $t$ in range $\frac{T}{T'}$ do

3:      while *spike_queue* not empty do

4:          $i = spike\_queue.\text{pop}()$

5:          $freq = \min(V[i]/thrd, T')$

6:          $V[i] = V[i]\%thrd$

7:          for $j$ in $E_i$ do

8:              $V[j] \mathrel{+}= W_{ij} * freq + leak$

9:              if $V[j] \geq thrd$ and $j$ not *spike* then

10:                  $spike\_queue.\text{push}(j)$ (a) Fully connected SNN topology (b) Convolutional SNN topology

EVENT-DRIVEN ACCELERATOR SUPPORTING INHIBITORY SPIKING NEURAL NETWORK

CROSS REFERENCES TO THE RELATED APPLICATIONS

This application is based upon and claims priority to Chinese Patent Application No. 202210010882.4 filed on Jan. 6, 2022, the entire contents of which are incorporated herein by reference.

TECHNICAL FIELD

The present invention relates to a spiking neural network acceleration method and an event-driven accelerator of a spiking neural network, and belongs to the technical field of spiking neural network acceleration.

BACKGROUND

Artificial neural networks are widely used in the fields of image recognition, target detection, natural language processing, and the like. However, in recent years, artificial neural networks have been developed towards deeper network levels and more complex network topologies. The computation delay and power consumption problems brought by it severely limit its further development. The spiking neural network is known as a third-generation neural network, is a local activation network in the running process, and naturally has the characteristics of low delay and low power consumption. Therefore, the spiking neural network is a key technology for breaking through the development bottleneck of the traditional artificial neural network, and has huge application prospects in the real-time field and the embedded field.

The spiking neural network and the artificial neural network have similar network topology, and the difference is mainly reflected in a neuron model. In FIG. 1, the artificial neuron model and the spiking neuron model are compared, and the formulas in the figure are computation processes of two neurons, respectively. In the figure, X denotes input data, W denotes connection weights, y denotes output data, V denotes neuron mode voltages, and $V_{thrd}$ denotes neuron spiking firing thresholds. Both neuron models accept multiple input data and both require a weighted sum of the input data. In contrast, the artificial neuron performs a weighted sum activation operation to obtain a final real value output. The spiking neuron utilizes the weighted sum to update the neuron membrane voltage, and determines whether to output the spiking signal or not by comparing the membrane voltage with an emission threshold. Since the spiking neurons may not be able to be successfully activated, the spiking neural network naturally has the characteristic of sparse network, which is also a key technology for breaking through the development bottleneck of artificial neural network.

However, there is an additional time dimension due to the spiking neural network, and the updating of neuron states has computation dependency relationships in different time steps. This results in the neuron state being updated possibly many times in the entire time domain, with a computation amount even greater than that of an artificial neural network having the same topology. In order to ensure the accuracy of the computation result of the spiking neural network, the traditional spiking neural network accelerator does not consider optimizing the computation process of the spiking neural network from the aspect of the control method, which obviously causes the spiking neural network accelerator to run inefficiently.

Furthermore, the spiking neural network hardware accelerator is divided into a time-driven accelerator and an event-driven accelerator according to implementation. The time-driven spiking neural network accelerator scans all neuron states at the end of each time step and determines whether the neurons transmit spiking signals or not. This approach is logically simple to implement, but there are a large number of redundant computations.

When the neuron membrane voltage exceeds a threshold, the event-driven spiking neural network accelerator transmits spiking signals, and the computation amount can be reduced by fully utilizing the spiking sparsity in the spiking neural network. However, because the connection weight in the inhibitory spiking neural network has a negative value, two error conditions may occur when the traditional event-driven accelerator runs the inhibitory spiking neural network:

1) the neuron membrane voltage floats near a threshold, so that the spiking neuron transmits spiking signals for multiple times in the same time step; and 2) the neuron membrane voltage exceeds a threshold at a certain intermediate state, but the final state is below the threshold, causing the neuron to erroneously transmit a spiking signal. The above two cases are collectively called spiking jitter problem. The spiking jitter problem is an error state in the computation process of the spiking neural network, which may cause the error output of the final result. Therefore, the existing event-driven network accelerator cannot support the inhibitory spiking neural network.

SUMMARY

For the defects of the prior art, the first objective of the present invention is to provide a spiking neural network acceleration method for constructing an approximate computation model according to a spiking neuron model and a spiking coding mode, computing a spiking firing frequency and further obtaining a computation result of a spiking neural network. In the method, the accurate firing time of the spiking signal on a fine-grained event slice can be ignored, so that the spike-input packet does not need to comprise accurate time information, and the spiking routing process and the subsequent neural computation process are greatly reduced.

The second objective of the present invention is to provide an event-driven spiking network accelerator for screening state information of neurons, storing neurons with a membrane potential level at an intermediate state exceeding a spiking transmission threshold, constructing an output queue and a bitmap of the neurons, and delaying the transmission time of spiking signals, and then judging whether the neurons in the output queue transmit spiking signals or not and computing the frequency of the spiking signals by combining the final membrane voltage states of the neurons so as to avoid transmitting the spiking signals in the intermediate state but not the final state when the neuron membrane voltage exceeds a threshold, thereby solving the spiking jitter problem.

In order to achieve one of the above objectives, a first technical solution of the present invention is as follows:

provided is a spiking neural network acceleration method, which comprises constructing an approximate computation model according to a spiking neuron model and a spiking coding mode to eliminate a computation dependency relationship of a spiking neural network at different time steps, thereby significantly reducing the computation delay brought to the spiking neural network by the time dimension, wherein the construction process comprises the following steps:

firstly, collecting all spiking signals in a coarse-grained time period into the same time slice;

secondly, computing a membrane voltage gain of a neuron in a time period according to the spiking signals in the first step;

thirdly, computing a spiking firing frequency through the membrane voltage gain in the second step; and fourthly, obtaining a computation result of the spiking neural network, namely a neuron with the maximum activation times by utilizing the spiking firing frequency in the third step.

Through continuous exploration and tests, an approximate computation model is constructed according to a spiking neuron model and a spiking coding mode. The approximate computation model computes the spiking firing frequency by utilizing the characteristic that the spiking firing frequency of the neuron in a time period is approximately proportional to the membrane voltage gain in the time period, and then the computation result of the spiking neural network is obtained.

Therefore, the approximate computation model of the present invention can ignore the accurate firing time of the spiking signals on the fine-grained event slice, so that the spike-input packet does not need to comprise accurate time information such as signal generation time. Each spike-input packet carries multiple spiking signals, which substantially reduces the spiking routing process and the subsequent neural computation process.

Furthermore, under the condition of ensuring that the model accuracy is sufficient, the present invention effectively reduces the computation amount in the network, and eliminates the performance downlink brought by the time dimension to the spiking neural network, and the spiking neural network does not depend on the computation in different time steps any more, thereby significantly reducing the computation delay brought by the time dimension to the spiking neural network and effectively improving the performance of the spiking neural network.

As a preferable technical measure:

in the first step, the approximate computation model ignores the characteristic of time semantic information of the spiking signals based on spiking frequency domain coding, and abandoning the time semantics of the spiking sequence by the operation of collecting spiking signals, so as to concentrate the spiking signals in a plurality of time steps into a single time step.

As a preferable technical measure:

in the second step, the membrane voltage gain of the neuron in a certain time period depends on the spiking stimulation intensity brought by the presynaptic neuron in the time period, and the specific computation formula is as follows:

$$\sum_{t=1}^{T'} X_t^j = \sum_{t=1}^{T'} \frac{1}{\tau}\left(\sum_{i=0}^{N} W_{i,j} * S_t^i + \text{leak}\right)$$
$$\approx \frac{1}{\tau}\left(\sum_{i=0}^{N} W_{i,j} * freq_i + \text{leak}\right)$$

wherein, $$X_t^j$$

denotes a membrane voltage gain of a neuron j at time t, $\tau$ denotes a time constant, $W_{i,j}$ denotes a connection weight between a neuron i and the neuron j, $$S_i^j$$

denotes whether the neuron i transmits a spiking signal at time t or not, leak denotes a leak item, and $freq_i$ denotes a spiking firing frequency of the neuron i in the time period.

As a preferable technical measure:

in the third step, the spiking firing frequency of the neuron is approximately proportional to the membrane voltage gain in the time period, and the membrane voltage gain is divided by the spiking transmission threshold to obtain an approximate spiking firing frequency; and the specific computation formula is as follows:

$$freq_j \sum_{t=1}^{T'} S_t^j \approx \left(\sum_{t=1}^{T'} X_t^j\right)/V_{thrd};$$

wherein, $V_{thrd}$ denotes a spiking firing threshold of a neuron.

As a preferable technical measure:

the formula of the computation amount of the spiking neural network is as follows:

$$C_s = T * \delta * \sum_{i=1}^{N} E_i.$$

The formula of the computation amount of the spiking neural network after acceleration is as follows:

$$C_{s'} = \delta' \frac{T}{T'} \sum_{i=1}^{N} E_i, \delta \leq \delta' \ll T' * \delta;$$

the acceleration method reduces the computation amount of the spiking neural network to $$\frac{\delta'}{T' * \delta}$$

times.

Wherein, $C_{s'}$ denotes a computation amount of the spiking neural network after acceleration, N denotes the number of neurons in the spiking neural network, i denotes a neuron label, $E_i$ denotes a set of succeeding neurons of the neurons, T denotes a length of total time steps of the neural network, T' denotes a time granularity, $\delta$ denotes an average activation rate of the neurons in a single time step in the spiking neural network, and $\delta'$ denotes an average activation rate of the neurons in the T' time step in the spiking neural network after acceleration.

In order to achieve one of the above objectives, a second technical solution of the present invention is as follows:

provided is an event-driven accelerator supporting an inhibitory spiking neural network, which applies the above spiking neural network acceleration method, wherein the event-driven accelerator supporting an inhibitory spiking neural network comprises a spike-input module, a control module, a state module, a compute module and a spike-output module; wherein the spike-input module is used for being responsible for the input and output of the accelerator, and is provided with a queue for storing a spike-input packet;

the control module is provided with a graph controller and a scheduler; wherein the graph controller is used for being responsible for searching postsynaptic neurons of spiking signals and corresponding connection weights, searching an offset and a number according to neuron labels in the spike-input packet, and then taking out all postsynaptic edges from an external memory; in order to realize the support of the accelerator on the spiking neural network with different topological structures, the topological structure of the spiking neural network is abstracted into a graph mode, and the network topology is stored in a Double Data Rate (DDR) SDRAM in a Control and Status Register (CSR) mode. In order to reduce the memory access overhead, the number of postsynaptic edges of all nodes and the offset are stored on the slice.

The scheduler is used for being responsible for scheduling relevant data of the postsynaptic neurons to a specific computation unit. In order to simplify the complexity of the hardware implementation of the scheduler, the scheduler employs a set-associated strategy for scheduling, i.e., each computation unit is responsible for updating a specific set of synaptic neuron states. In this way, after a given network topology, the scheduling of computation data can be compiled in the CSR off-line, reducing the overhead incurred by on-line scheduling.

The state module is provided with a set of neuron state storage units SU, wherein each neuron state storage unit SU stores state information of a set of neurons, and the state information comprises membrane potential levels and spiking transmission thresholds;

the compute module is provided with a set of neural computation units, wherein each neural computation unit CU comprises a multiplier-adder and a comparator;

the spike-output module is provided with a set of deduplication queues capable of writing input packets into different positions according to whether the neurons are output neurons or not, and encapsulating the output neurons into spike-input packets and transmitting the spike-input packets to the spike-input module;

the deduplication queue comprises an output queue, a bitmap and a computation submodule cal_freq for computing a spiking frequency; wherein the output queue is used for storing all neuron labels with a membrane potential level at an intermediate state exceeding a threshold;

the bitmap is used for identifying whether neurons are already present in an output queue or not so as to avoid the neurons from being repeatedly pressed into the queue; when all data in the spike-input module are processed successfully, the computation submodule determines whether the neurons in the output queue transmit spiking signals or not and computes frequencies of the spiking signals by combining final membrane voltage states of the neurons.

The present invention can screen the state information of the neurons, store neurons with a membrane potential level at an intermediate state exceeding a spiking transmission threshold, construct an output queue and a bitmap of the neurons, delay the transmission time of spiking signals, and then determine whether the neurons in the output queue transmit spiking signals or not and computes the frequency of the spiking signals by combining the final membrane voltage states of the neurons so as to avoid transmitting the spiking signals in the intermediate state but not the final state when the neuron membrane voltage exceeds a threshold, thereby solving the problem of spiking jitter.

Meanwhile, the present invention sets a bitmap for identifying whether neurons are already present in the output queue or not so as to effectively avoid the neurons from being repeatedly pressed into the queue and the same neuron from entering the queue for multiple times, thereby thoroughly solving the spiking jitter problem.

Furthermore, the present invention enables the event-driven network accelerator to support the inhibitory spiking neural network, so that the inhibitory spiking neural network can also fully utilize the spiking sparsity of the event-driven network accelerator to reduce the computation amount.

As a preferable technical measure:

the spike-input packet is of a binary structure and comprises a neuron label and a spiking activation frequency; wherein the neuron label is used for indicating a source of the spiking signal;

the spiking activation frequency is used for reflecting the number of times that neurons are activated in the coarse-grained time period so as to realize the support on the approximate computation model.

Since the approximate computation model ignores the accurate firing time of the spiking signals on the fine-grained event slice; the spike-input packet does not need to comprise accurate time information such as signal generation time, Each spike-input packet carries multiple spiking signals, which substantially reduces the spiking routing process and the subsequent neural computation process.

As a preferable technical measure:

the neural computation unit CU and the neuron state storage unit SU have a one-to-one mapping relationship, when the neural computation unit CU receives a spike input of the postsynaptic neurons, the neural computation unit firstly updates state information of the neurons stored in the neuron state storage unit SU, and then determines whether to send a spike-output packet to a spike-output queue or not.

As a preferable technical measure:

the deduplication queue utilizes a bitmap to identify whether the neurons are already present in the output queue or not so as to avoid the neuron being repeatedly pressed into the queue; the transmission time of the spiking signal is delayed, and the spiking firing frequency is computed by combining the final membrane voltage state of the neurons; so as to avoid transmitting the spiking signals in the intermediate state when the neuron membrane voltage exceeds a threshold, thereby solving the problem of spiking jitter.

As a preferable technical measure:

the computation process of the accelerator supporting the inhibitory spiking neural network is divided into two stages:

the first stage is a process of performing spiking routing and updating the postsynaptic neurons according to the spike-input packet; and

the second stage is the process that the spike-output module computes the spiking firing frequency according to a final membrane potential level of the neurons in the output queue.

Compared with the prior art, the present invention has the following beneficial effects:

Through continuous exploration and tests, an approximate computation model is constructed according to a spiking neuron model and a spiking coding mode. The approximate computation model computes the spiking firing frequency by utilizing the characteristic that the spiking firing frequency of the neuron in a time period is approximately proportional to the membrane voltage gain in the time period, and then the computation result of the spiking neural network is obtained.

Therefore, the approximate computation model of the present invention can ignore the accurate firing time of the spiking signals on the fine-grained event slice, so that the spike-input packet does not need to comprise accurate time information such as signal generation time. Each spike-input packet carries multiple spiking signals, which substantially reduces the spiking routing process and the subsequent neural computation process.

Furthermore, under the condition of ensuring that the model accuracy is sufficient, the present invention effectively reduces the computation amount in the network, and eliminates the performance downlink brought by the time dimension to the spiking neural network, and the spiking neural network does not depend on the computation in different time steps any more, thereby significantly reducing the computation delay brought by the time dimension to the spiking neural network and effectively improving the performance of the spiking neural network.

Furthermore, through continuous exploration and tests, the technical prejudice that the existing event-driven spiking network transmits spiking signals in the intermediate state but not the final state when the neuron membrane voltage exceeds a threshold is broken through.

The present invention can screen the state information of the neurons, store neurons with a membrane potential level at an intermediate state exceeding a spiking transmission threshold, construct an output queue and a bitmap of the neurons, delay the transmission time of spiking signals, and then determine whether the neurons in the output queue transmit spiking signals or not and computes the frequency of the spiking signals by combining the final membrane voltage states of the neurons so as to avoid transmitting the spiking signals in the intermediate state but not the final state when the neuron membrane voltage exceeds a threshold, thereby solving the problem of spiking jitter.

Meanwhile, the present invention sets a bitmap for identifying whether neurons are already present in the output queue or not so as to effectively avoid the neurons from being repeatedly pressed into the queue and the same neuron id from entering the queue for multiple times, thereby thoroughly solving the spiking jitter problem.

Furthermore; the present invention enables the event-driven network accelerator to support the inhibitory spiking neural network, so that the inhibitory spiking neural network can also fully utilize the spiking sparsity of the event-driven network accelerator to reduce the computation amount.

BRIEF DESCRIPTION OF THE DRAWINGS

FIG. 3 is a pseudo code diagram of an artificial neural network processing process;

FIG. 4 is a pseudo code diagram of a spiking neural network processing procedure;

DETAILED DESCRIPTION OF THE EMBODIMENTS in order to make the objectives, technical solutions and advantages of the present invention more apparent, the present invention is further described in detail below with reference to the accompanying drawings and embodiments. It should be understood that the specific embodiments described herein are merely illustrative of the present invention and do not limit the present invention.

On the contrary, the present invention is intended to cover alternatives, modifications, equivalents and solutions which may be included within the spirit and scope of the present invention as defined by the appended claims. Furthermore, in the following detailed description of the present invention, certain specific details are set forth in order to provide a thorough understanding of the present invention. It will be apparent to those skilled in the art that the present invention may be practiced without these specific details.

Figure 1:
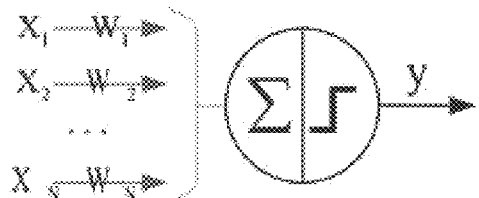
FIG. 1 is a diagram comparing an artificial neuron model with a spiking neuron model.
Figure 1:
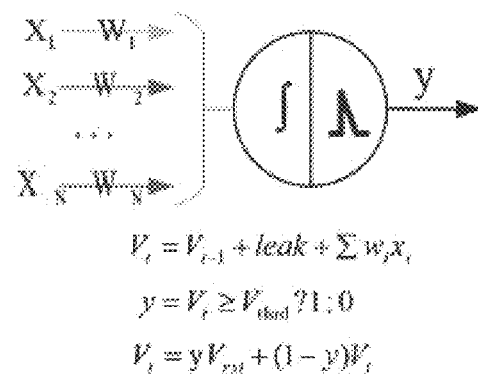
Figure 2:
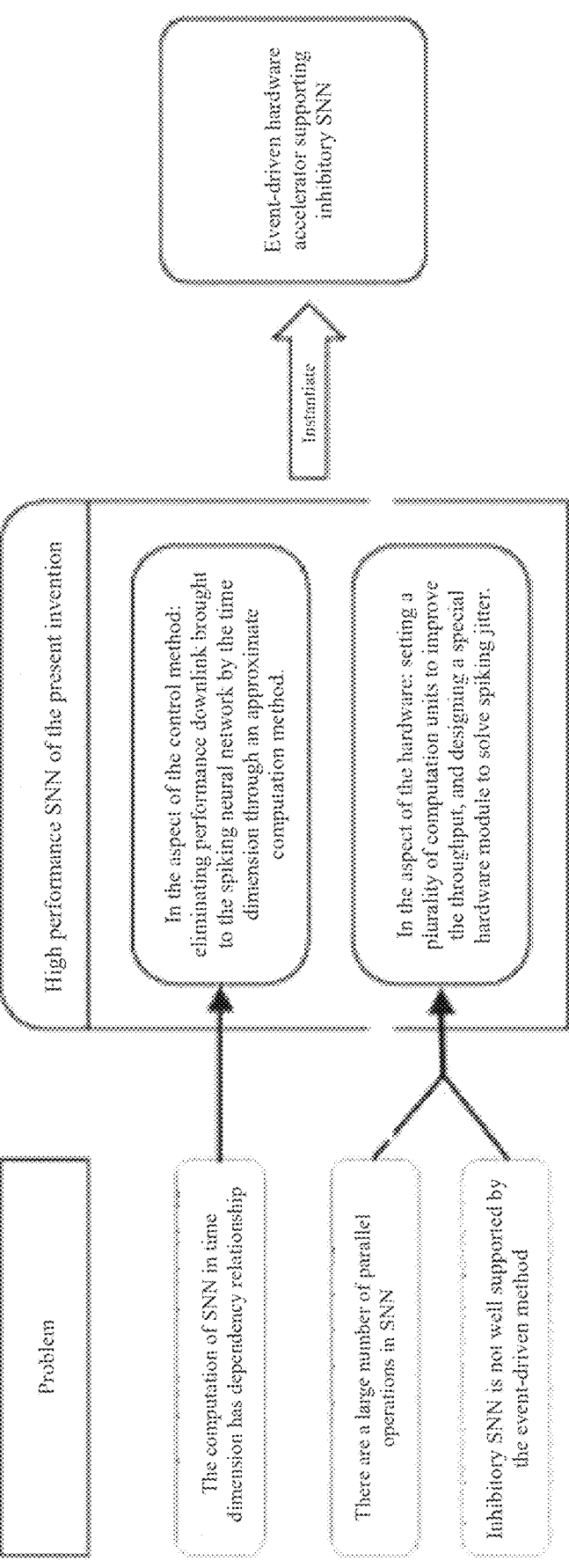
FIG. 2 is an overall logic flowchart of the present invention.

As shown in FIG. 2, the present invention optimizes from the aspects of the control method and the hardware design, respectively, and solves the problems of high computation delay, small application range, etc. that may occur in the conventional event-driven spiking neural network. In the aspect of the control method, the present invention provides a spiking neural network acceleration method, which utilizes the constructed approximate model to effectively reduce the computation amount of the spiking neural network and significantly reduce the computation delay. In the aspect of the hardware design, the spiking neural network accelerator of the present invention is provided with a plurality of computation units and a special compute module, solves the problem of spiking jitter and constructs an event-driven accelerator supporting an inhibitory spiking neural network.

One specific embodiment of the spiking neural network acceleration method of the present invention is as follows:

provided is a spiking neural network acceleration method, which comprises constructing an approximate computation model according to a spiking neuron model and a spiking coding mode to eliminate a computation dependency relationship of a spiking neural network at different time steps, thereby significantly reducing the computation delay brought to the spiking neural network by the time dimension, wherein the construction process comprises the following steps:

firstly, collecting all spiking signals in a coarse-grained time period into the same time slice;

secondly, computing a membrane voltage gain of a neuron in a time period according to the spiking signals in the first step;

thirdly, computing a spiking firing frequency through the membrane voltage gain in the second step; and fourthly, obtaining a computation result of the spiking neural network by utilizing the spiking firing frequency in the third step.

Through continuous exploration and tests, an approximate computation model is constructed according to a spiking neuron model and a spiking coding mode. The approximate computation model computes the spiking firing frequency by utilizing the characteristic that the number of spiking firing times of the neuron in a time period is approximately proportional to the membrane voltage gain in the time period, and then the computation result of the spiking neural network is obtained.

The approximate computation model of the present invention can ignore the accurate firing time of the spiking signals on the fine-grained event slice, so that the spike-input packet does not need to comprise accurate time information such as signal generation time. Each spike-input packet carries multiple spiking signals, which substantially reduces the spiking routing process and the subsequent neural computation process.

Furthermore, under the condition of ensuring that the model accuracy is sufficient, the present invention effectively reduces the computation amount in the network, and eliminates the performance downlink brought by the time dimension to the spiking neural network, and the spiking neural network does not depend on the computation in different time steps any more, thereby significantly reducing the computation delay brought by the time dimension to the spiking neural network and effectively improving the performance of the spiking neural network.

One specific embodiment of the approximate computation model ACS of the spiking neural network of the present invention is as follows:

Theoretically, the spiking neural network has the characteristics of low delay and low energy consumption compared with the artificial neural network, but due to the existence of the additional time dimension, it is often not the case in the experiment. To describe the problem more formally, the neural network is abstracted as a precedence graph G, and the neurons are numbered according to the topological sorting of the precedence graph.

The computation processes of the artificial neural network and the spiking neural network are described by using the algorithms shown in FIG. 3 and FIG. 4, respectively, wherein, N denotes the number of neurons, $E_i$ denotes a set of succeeding neurons of the neuron i, T denotes the length of total time steps of the neural network, $\delta$ denotes an average activation rate of neurons in a single time step in the spiking neural network, and $W_{ij}$ denotes a connection weight between the neuron i and the neuron j. V, delay and thrd denote a neuron membrane voltage, a delay and a spiking firing threshold, respectively.

By analyzing the algorithms shown in FIG. 3 and FIG. 4, the computation amounts of the artificial neural network and the spiking neural network are $$C_a = \sum_{i=1}^{N} E_i; \text{ and } C_s = T * \delta * \sum_{i=1}^{N} E_i,$$

respectively. Comparing $C_a$ and $C_s$, when T*$\delta$>1, the computation delay of the spiking neural network is higher than that of the artificial neural network.

In order to eliminate the performance downlink brought by the time dimension to the spiking neural network, the present invention provides an approximate computation model ACS for the spiking neural network from the aspect of the control method. In order to more easily describe the theoretical basis of the approximate computation model, three fact-based conditions are given here.

The first condition is as follows: in the spiking neural network application, the LIF (Leaky Integrate and Fire) model and the IF (Integrate and Fire) model are the most commonly used spiking neuron models, and these two neuron models greatly simplify the spiking response process of biological neurons and make a trade-off between biological authenticity and computational efficiency. The spiking coding modes mainly include frequency domain coding and time domain coding, and spiking frequency domain coding is the most widely applied spiking coding mode due to the advantages of simplicity, easiness in training and the like.

The second condition is as follows: the spiking coding mode of the mainstream is to code each input data into one spiking sequence. Time domain coding is to code input data information in the temporal structure of a spiking sequence. For example, the larger the input data value is, the smaller the spacing of the spiking sequence is. Unlike time domain coding, spiking frequency domain coding ignores time semantic information between spiking signals, only focuses on the overall firing frequency of the spiking signals in the whole time domain, and the larger the value of the input is, the higher the spiking frequency is.

The third condition is as follows: for the IF and LIE neuron models, the number of spiking firing times of the neuron in a time period is approximately proportional to the membrane voltage gain in the time period. That is to say:

$$\sum_{t=1}^{T'} S_t \propto \sum_{t=1}^{T'} X_t,$$

wherein $S_t$ denotes whether a spiking signal is transmitted at time t or not, and $X_t$ denotes a membrane voltage gain at time t.

The second condition shows that the spiking frequency domain coding does not pay attention to the distribution of the spiking signals in the time domain. In other words, for the same input data, the frequency domain coding cannot guarantee that the Obtained spiking sequences are consistent, and only can guarantee that the number of spiking signals in the spiking sequence is the same.

Therefore, all spiking signals in the coarse-grained time period can be collected into the same time slice. This allows the membrane voltage gain of the neuron in a time period to be computed at one time step. The collection of spiking signals shields the time semantic information of spiking signals, and the frequency domain coding does not pay attention to time semantics, so that this method is theoretically feasible. The collection operation is somewhat similar to batch operations, which can significantly reduce the spiking routing process. An example of 4 spiking collections is given in FIG. 6, wherein the sequence on the left represents the input data represented by the spiking sequences coded in the frequency domain, and the sequence on the right represents the input data represented by the spiking sequences after spiking collection, the numbers denoting the input data.

The third condition shows that if the membrane voltage gain can be computed in a time period, then the spiking firing frequency of the neuron in the time period can be approximately estimated. Of course, the accuracy of model estimation depends on the model itself. The closer the neuron membrane voltage is to the spiking firing threshold each time a spiking signal is fired, the smaller the error is in the estimation. Operations such as regularization can be adopted during model training to keep the absolute value of the neuron connection weight at a lower level, so that the accuracy of the model estimation can be ensured at a better level. Combining the second condition and the third condition, the spiking firing frequency of all the neurons in the spiking neural network in a time period can be estimated, wherein the spiking firing frequency of the output neurons is the computation result of the spiking neural network, and thus the approximate computation model ACS of the spiking neural network is obtained.

Figures 5, 6:
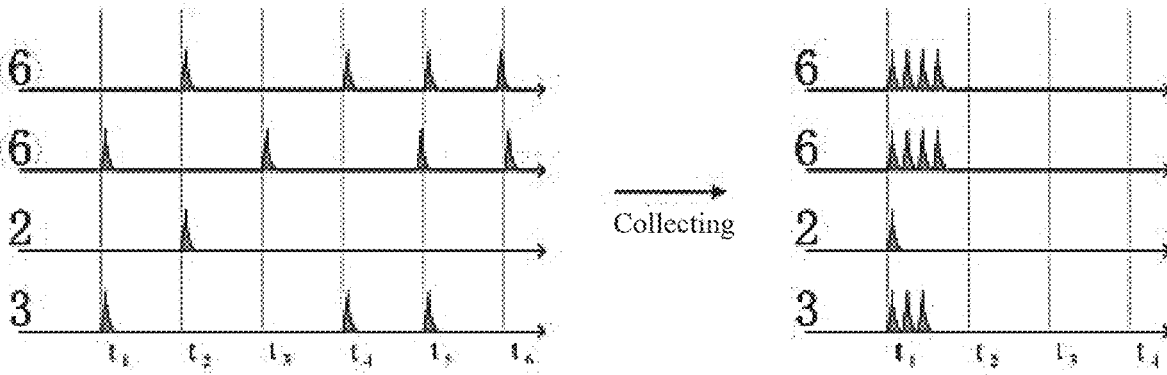
FIG. 5 is a pseudo code diagram of an approximate computation model for the spiking neural network according to the present invention.
FIG. 6 is a diagram of a spiking signal collection process according to the present invention.

The algorithm shown in FIG. 5 illustrates the computation process of the spiking neural network using the approximate computation model ACS which can significantly reduce the computation delay brought to the spiking neural network by the time dimension. As can be seen from the analysis of the algorithm, after the approximate computation model ACS is used, the computation amount of the spiking neural network is $$C_{s'} = \delta' \frac{T}{T'} \sum_{i=1}^{N} E_i, \ T'$$

denotes a time granularity, and $\delta'$ denotes an average activation rate of neurons in T' time step(s) in the spiking neural network after acceleration. Since the spiking neural network is highly sparse and there is a high probability that neurons are activated in a time period, $\delta' \ll 1$ and $\delta < \delta' \ll T*\delta$ are satisfied for $\delta'$. Under the condition of ensuring sufficiently model accuracy by selecting a proper time granularity T', the computation amount is significantly less than that of a conventional spiking neural network and an artificial neural network.

One embodiment of the high-performance accelerator supporting the inhibitory spiking neural network of the present invention is as follows:

The accelerator mainly comprises 5 main components, namely a spike-input module, a control module, a state module, a compute module and a spike-output module.

The spike-input module is responsible for the input and output of the accelerator. The module comprises a queue for storing spike-input packets. The data are derived from either the image input data in the external memory or from the output data of the spike-output unit. Different from the input data of the conventional spiking neural network accelerator, the spike-input packet is composed of a binary group (neuron label, spiking activation frequency). The neuron label indicates the source of the spiking signal, and the spiking activation frequency reflects the number of times that the neurons are activated in the coarse-grained time period so as to realize the support on the approximate computation model. Since the approximate computation model ignores the accurate firing time of the spiking signals on the fine-grained event slice, the spike-input packet does not need to comprise accurate time information such as signal generation time. Each spike-input packet carries multiple spiking signals, which substantially reduces the spiking routing process and the subsequent neural computation process.

The control module comprises two submodules, namely a graph controller Router and a Scheduler. The graph controller is responsible for searching the postsynaptic neurons of the spiking signals and the corresponding connection weights.

In order to realize the support of the accelerator on the spiking neural network with different topological structures, the topological structure of the spiking neural network of the present invention is abstracted into a graph mode, and the network topology is stored in a DDR in a CSR mode. In order to reduce the memory access overhead, the number of postsynaptic edges of all nodes and the offset are stored on the slice.

The controller searches the offset and the number according to the neuron labels in the spike-input packet, and then takes out all the postsynaptic edges from the external memory. The scheduler is responsible for scheduling relevant data of the postsynaptic neurons to a specific computation unit. In order to simplify the complexity of the hardware implementation of the scheduler, the scheduler employs a set-associated strategy for scheduling, i.e., each computation unit is responsible for updating a specific set of synaptic neuron states. In this way, after a given network topology, the scheduling of computation data can be compiled in the CSR reducing the overhead incurred by on-line scheduling.

The state module comprises a set of neuron state storage units SU, each SU storing state information of a set of neurons, such as membrane potential levels and spiking transmission thresholds.

Figure 7:
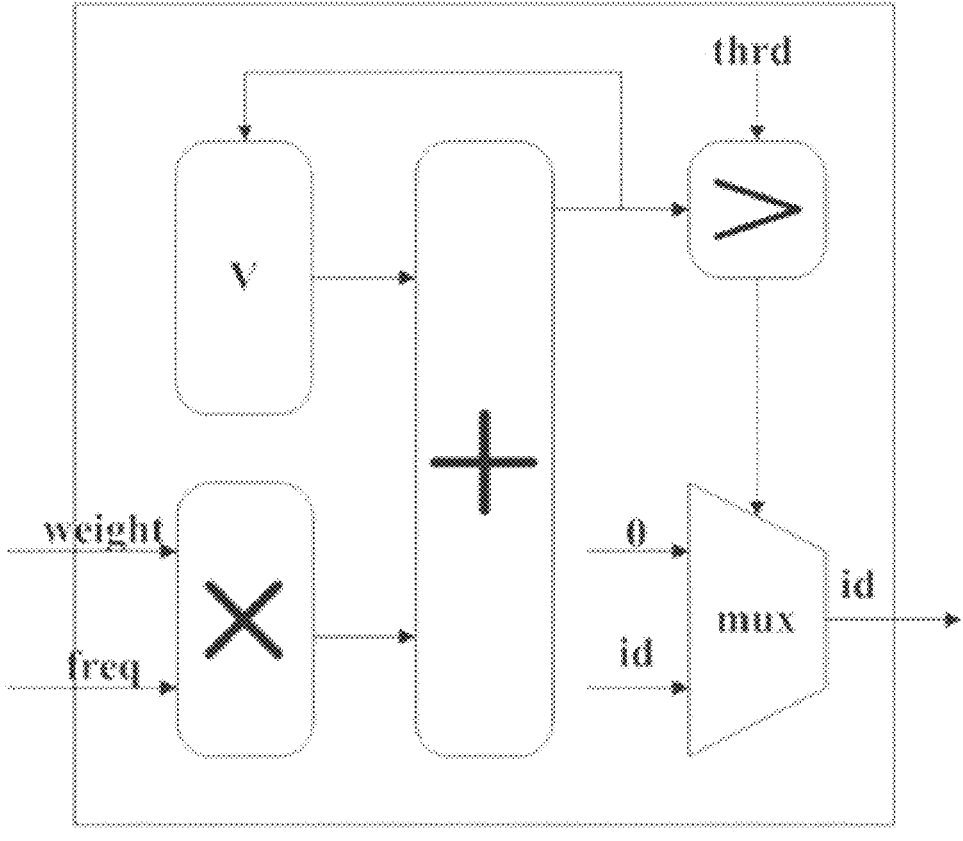
FIG. 7 is a diagram of a computation unit according to the present invention.

The computer module is composed of a set of neural computation units CU, each CU comprising a multiplier-adder and a comparator, as shown in FIG. 7. The CU and the SU have a one-to-one mapping relationship, and when the CU receives a spike input of the postsynaptic neurons, the CU firstly updates the state information of the neurons stored in the SU and then determines whether to send a spike-output packet to a spike-output queue or not.

Figure 8:
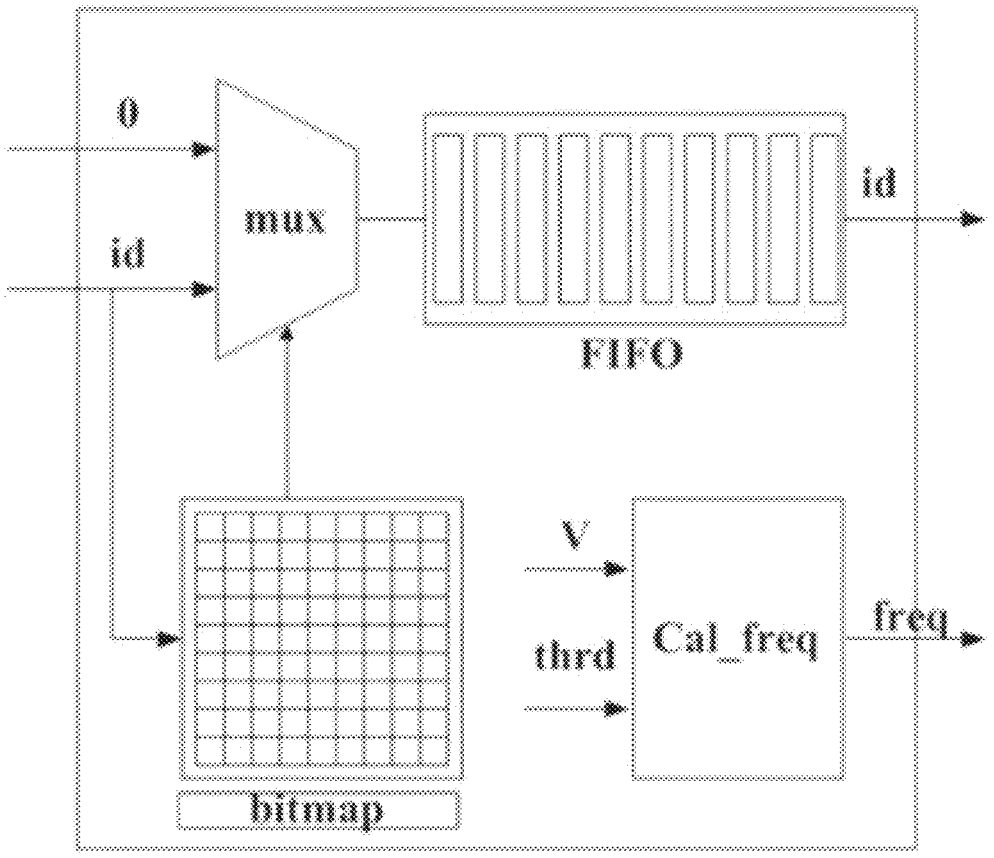
FIG. 8 is a structural diagram of a deduplication queue according to the present invention.

The spike-output module is composed of a set of deduplication queues. The deduplication queue comprises an output queue, a bitmap and a submodule cal_freq for computing the spiking frequency, as shown in FIG. 8. The output queue is used for storing all neuron labels with the membrane potential level at an intermediate state exceeding a threshold. In order to avoid the neurons being repeatedly pressed into the queue, the bitmap is used for identifying whether neurons are already present in an output queue or not. When all data in the spike-input module are processed successfully, the submodule cal_freq determines whether the neurons in the output queue transmit spiking signals or not and computes frequencies of the spiking signals by combining final membrane voltage states of the neurons. The deduplication queue is designed to solve the problem of spiking jitter, which essentially delays the transmission time of spiking signals on the one hand and avoids the same neuron id from entering the queue for multiple times on the other hand, thereby thoroughly solving the problem of spiking jitter.

Figure 9:
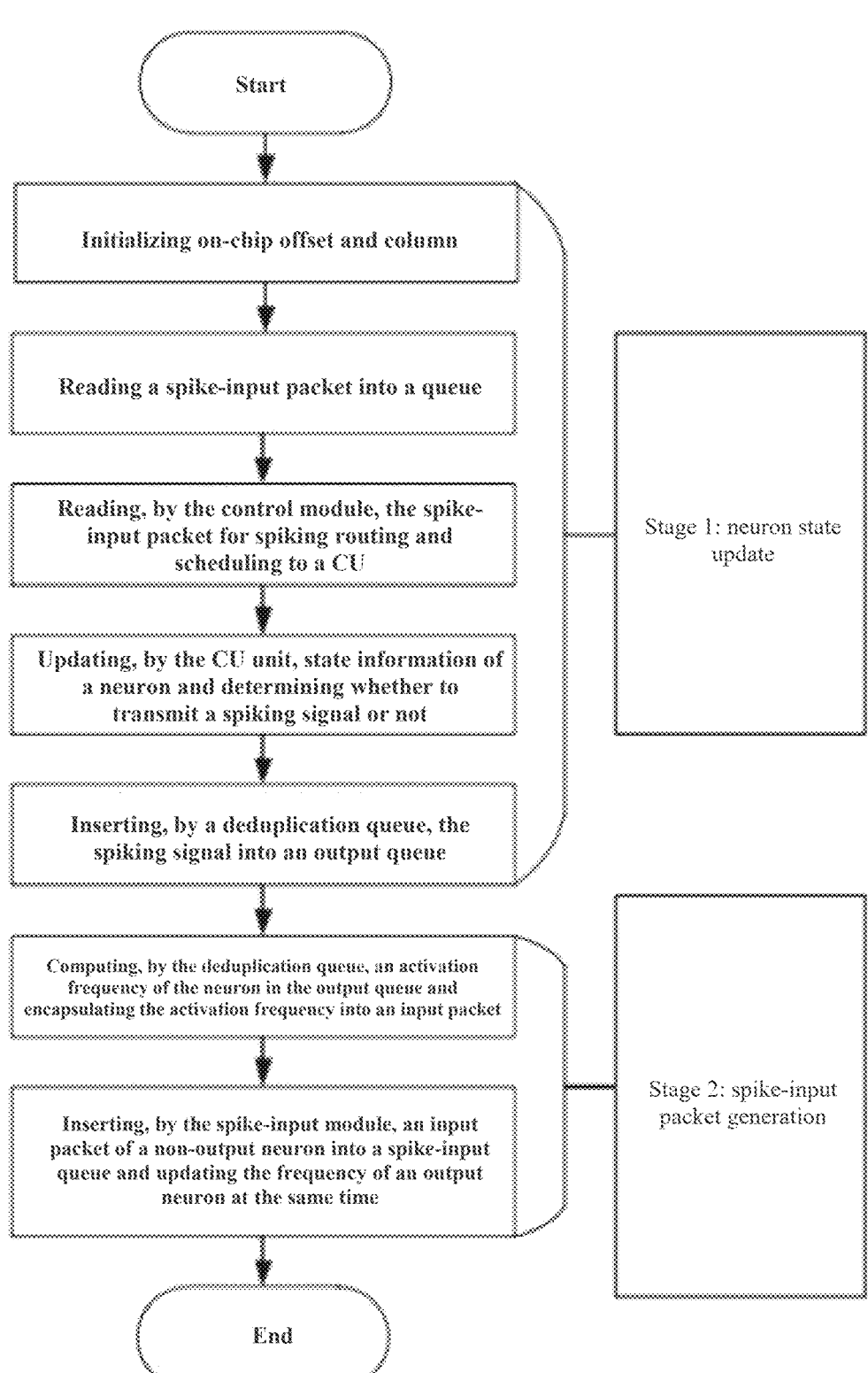
FIG. 9 is a flowchart of the ESN N computation according to the present invention.

In general, the computation process of the high-performance accelerator supporting the inhibitory spiking neural network is divided into two stages, as shown in FIG. 9. The first stage is the process of performing spiking routing and updating the postsynaptic neurons according to the spike-input packet. In this stage, spiking routing and neuron state updates are pipelined to improve hardware utilization. The second stage is the process that the spike-output module computes the spiking firing frequency according to a final membrane potential level of the neurons in the output queue. The spike-output unit encapsulates the neuron label and the spiking firing frequency into a spike-input packet, and the spike-input packet is delivered to the spike-input module. The spike-input module writes the input packet into different positions according to whether the neuron is an output neuron or not.

The most preferably embodiment of the present invention is as follows:

The present invention optimizes the control algorithm and the hardware architecture, designs and develops a high-performance spiking neural network hardware accelerator based on an FPGA platform. The accelerator updates the neuron state in an event-driven manner.

In the aspect of the control method, the present invention provides an approximate computation model by combining the most commonly used spiking neuron model and the characteristics of spiking frequency domain coding. Theoretical analysis and experimental verification show that the approximation method can greatly reduce the computation amount of the spiking neural network under the condition of ensuring slight loss of model accuracy.

In the aspect of the hardware, on the one hand, a plurality of computation units are set to improve the parallelism degree and a plurality of modules are pipelined to improve the system throughput; on the other hand, by designing a novel hardware module and re-planning a computation process, the problem of spiking jitter is solved, and thus the support of an event-driven spiking neural network accelerator on an inhibitory spiking neural network is realized.

One specific embodiment for verifying the accuracy of the model of the present invention is as follows:

In order to verify the feasibility of the method provided in the present invention, verification is carried out from the aspects of the control method and the hardware, respectively. In the aspect of the control method, 3 types of spiking neural network models are established and are tested on MNIST, Fashion_MNIST and CIFAR10 datasets, respectively. The prediction accuracy obtained from the spiking neural network using the approximate computation model ACS is compared with the prediction accuracy obtained from the spiking neural network without using the approximate computation model ACS to analyze the accuracy loss caused by the approximate computation model ACS.

ing neural network is deployed to FEAS as an example application. The operation result of FEAS is compared with the operation result of the method to verify whether FEAS can realize the support on the inhibitory spiking neural network or not. The throughput and prediction accuracy of FEAS are used as key indicators to compare with related work.

Figure 10:
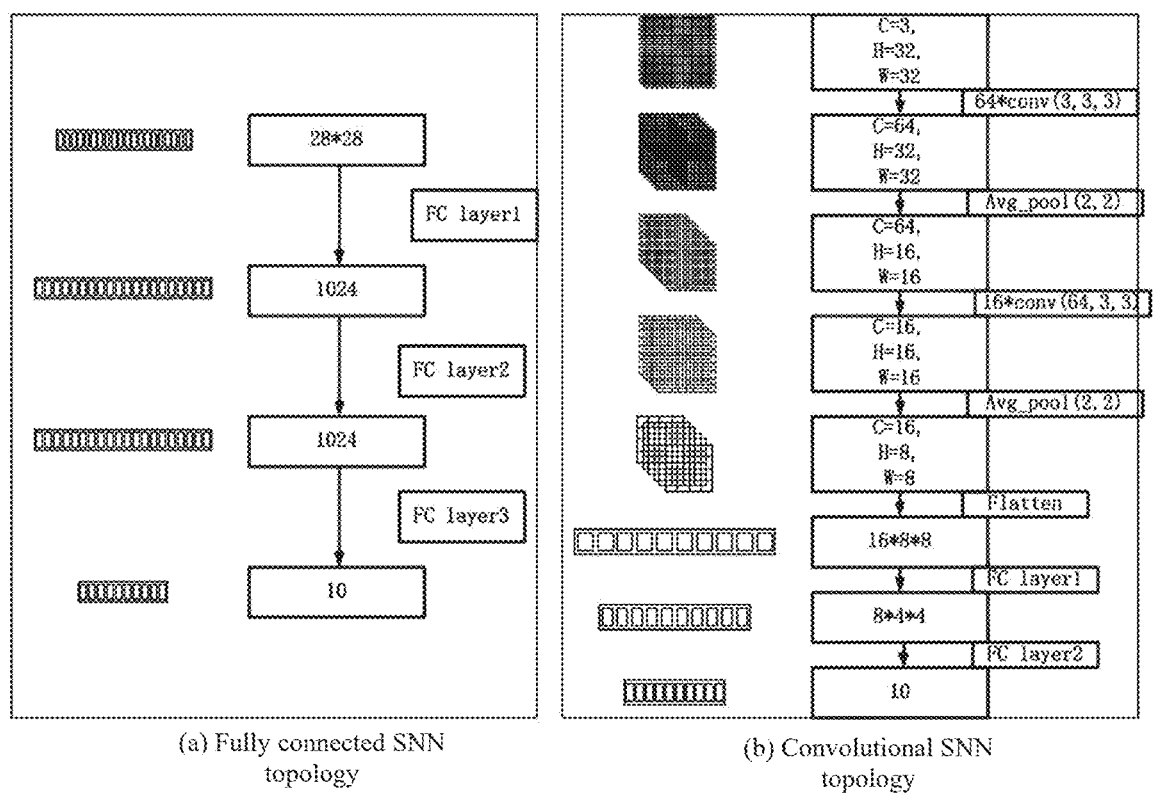
FIG. 10 is a diagram of IF_SNN/LIF_SNN topology and CONV_SNN topology according to the present invention.

One embodiment for verifying the accuracy loss of the approximate computation model ACS of the present invention is as follows:

in order to verify the accuracy loss of the spiking neural network brought by the approximate computation model ACS, 3 types of spiking neural network models are constructed based on a spikingjelly deep-learning framework, namely, IF_SNN, LIF_SNN and CONV_SNN. IF_SNN is a network based on an IF neuron model that comprises 4 fully connected layers. IF_SNN is used to perform classification tasks on the MNIST handwritten digit dataset. LIF_SNN and IF_SNN have the same network topology, except that LIF_SNN is based on LIF neurons, and the network is used on the Fashion_MNNIST dataset as a training and testing set. CONV_SNN is a convolutional spiking neural network based on IF neurons that performs the classification operation on the CIFAR10 dataset. (a) in FIG. 10 shows an IF_SNN/LIF_SNN network topology, and (b) in FIG. 10 shows a CONV_SNN topology. The details of the three types of spiking neural network models are shown in Table 1, wherein the prediction accuracy of the three types of models is used as the reference accuracy to compare with the prediction accuracy of the spiking neural network SNN using the approximate computation model ACS.

Figure 11:
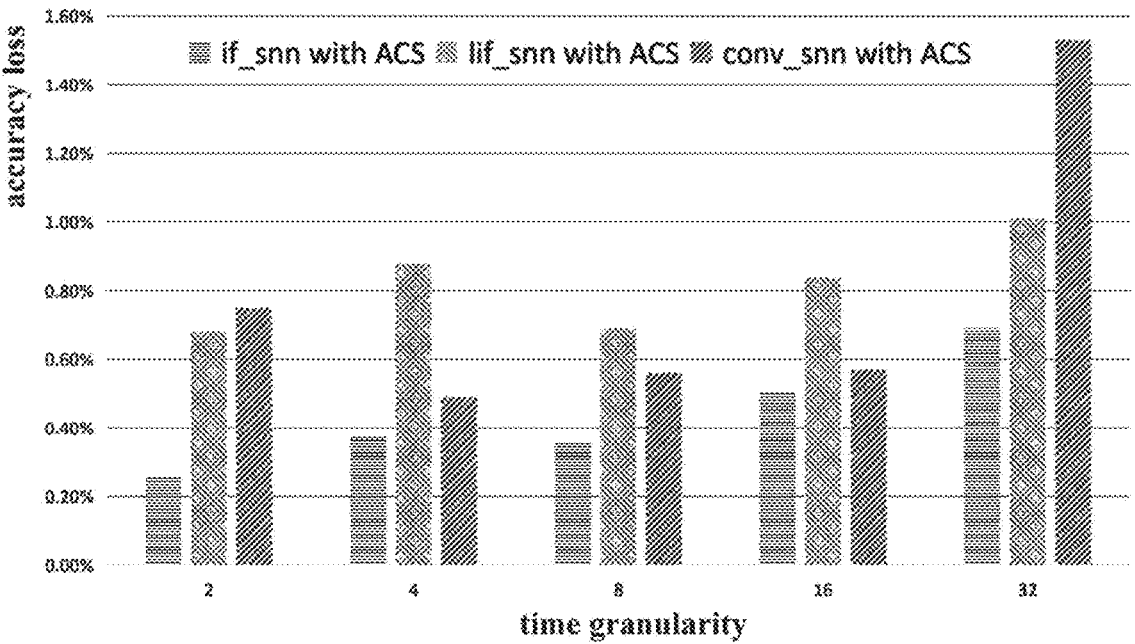
FIG. 11 is a comparison diagram of the accuracy loss of the spiking neural network bought by an approximate computation model ACS with different time granularities.

After the model training is completed, prediction is performed on the testing set by using an approximate computation model ACS based on model parameter information. The time granularity in the approximate computation model ACS is divided into five lengths of 2, 4, 8, 16 and 32. FIG. 11 illustrates the accuracy loss of the three types of models using the approximate computation model ACS with different time granularities. Experimental results show that even if the time granularity of the approximate computation model ACS is set to 32 time steps (which means that the computation amount in the original 32 time steps is now completed in one time step), the accuracy loss still remains within 2%. For IF_SNN and LIF_SNN, the accuracy loss remains within 1%, which indicates the rationality of the approximate computation model ACS.

TABLE 1

| Detailed information of IF_SNN, LIF_SNN and CONV_SNN | | | | |
|---|---|---|---|---|
| SNN model | Neuron model | Network topology | Dataset | Model accuracy |
| IF_SNN | IF neuron | 4 fully connected layers of network | MNIST | 98.23% |
| LIF_SNN | LIF neuron | 4 fully connected layers of network | Fashion_MINST | 88.77% |
| CONV_SNN | IF neuron | Convolutional network | CIFAR10 | 60.23% |

In the aspect of the hardware, a spiking neural network (SNN) accelerator FEAS is implemented on an Xilinx ZC706 FPGA platform by using a high-level synthesis language (HLS). FEAS is a configurable and time-driven spiking neural network accelerator. A fully connected spik- It should be noted that the L2 regularization operation is added during the model training. The L2 regularization can prevent over-fitting of the model on the one hand and ensure that the weight of the model is sufficiently small on the other hand. The spiking neural network SNN model obtained by such training better accords with the third condition in the approximate algorithm. After the L2 regularization is added, the influence of the approximate computation model ACS on the model accuracy is smaller.

One embodiment for verifying the architectural rationality of the spiking neural network accelerator of the present invention is as follows:

In order to verify that an event-driven spiking neural network accelerator architecture ESNN can realize the support on an inhibitory spiking neural network, a spiking neural network hardware accelerator FEAS is instantiated on an Xilinx ZC706 FPGA platform based on ESNN. FEAS can support a spiking neural network comprising 8096 IF spiking neurons and up to 64K synaptic connections, which can run at frequencies up to 200 MHz. Eight CU units are integrated in FEAS, each CU unit being responsible for updating 1024 spiking neuron states. Table 2 shows the amount of ZC706 FPGA hardware resources consumed by FEAS.

TABLE 2

| FEAS resource usage | | | |
|---|---|---|---|
| Hardware resource | Usage | FPGA resource total | Percentage of usage |
| FF | 40310 | 437200 | 9.22% |
| LUT | 32786 | 218600 | 15% |
| BRAM | 134 | 1090 | 24.59% |
| DSP | 40 | 900 | 4.44% |
| MMCM | 1 | 8 | 12.50% |

IF_SNN is chosen as an exemplary sample to be deployed to FEAS. The IF_SNN is an inhibitory spiking neural network SNN model trained based on the spikingjelly computation framework. The prediction accuracy of IF_SNN on the MNIST dataset is 98.23%. Based on the IF_SNN model parameter information, the testing set is re-predicted using the approximate computation model ACS with the time granularity of 32. The result shows that the accuracy predicted by the approximate computation model ACS is up to 97.54%, that is, the approximate computation model only causes 0.69% accuracy loss to the model. And then, the images in the testing set are converted into a spiking signal sequence through Poisson distribution coding, then encapsulated into a spike-input packet as input data and then delivered to FEAS for operation. The operation result of FEAS is consistent with the result of the operation on a general-purpose CPU, which proves that FEAS can support the inhibitory spiking neural network. FEAS can process 3K+digital pictures on the MNIST dataset on average per second, and compared with the conventional spiking neural network SNN accelerator, FEAS improves the throughput by nearly one order of magnitude. In conclusion, the hardware acceleration solution of the high-performance spiking neural network provided in the present invention is proved to be reasonable and feasible.

The present invention provides a design solution of a high-performance spiking neural network hardware accelerator aiming at the limitation of a general-purpose computing platform and special spiking neural network acceleration hardware in the application of processing a spiking neural network SNN. The solution combines method algorithm optimization and hardware architecture optimization, and realizes efficient support on a general-purpose spiking neural network (excitation type and inhibitory type). Based on the proposed design solution, an event-driven spiking neural network hardware accelerator FEAS is instantiated on an Xilinx ZC706 FPGA platform. The application of an inhibitory spiking neural network for MNIST handwritten digit recognition is run on FEAS. The operation result shows that FEAS can process 3K+image data per second under the condition that the model accuracy is ensured to be up to 97.54%. Compared with the conventional spiking neural network accelerator, FEAS improves the throughput by nearly one order of magnitude, which proves that the proposed design solution of the accelerator is reasonable and has practical application prospect.

The present invention eliminates the computation overhead brought by time dimension in the computation process of the spiking neural network through the approximate computation model ACS provided from the aspect of the control method. Theoretical analysis and experimental verification show that the approximate computation model can greatly reduce the computation amount in the spiking neural network under the condition of ensuring slight loss of model accuracy.

The event-driven spiking neural network acceleration hardware architecture (ESNN) of the present invention can support the approximate computation model proposed in the present invention. Meanwhile, through the special hardware module and the re-division of the computation process, ESNN solves the problem of spiking jitter and realizes efficient support on the inhibitory spiking neural network.

In order to verify the feasibility of the technical solution, the present invention instantiates a spiking neural network SNN accelerator FEAS on an FPGA platform. The application of an inhibitory spiking neural network SNN for MNIST handwritten digit recognition is deployed on FEAS. Experimental results show that FEAS can process 3K+digital images per second under the condition that the model prediction accuracy is ensured to be up to 97.54%. Compared with the conventional similar application of the operation of the spiking neural network SNN accelerator, FEAS improves the throughput of the model by nearly one order of magnitude, which proves that the solution proposed in the present invention is feasible.

It should be appreciated by those skilled in the art that embodiments of the present application may be provided as a method, a system, or a computer program product. Accordingly, the present application may take the forms of a hardware-only embodiment, a software-only embodiment or an embodiment combining software and hardware. Furthermore, the present application may take the form of a computer program product implemented on one or more computer-usable storage media (including, but not limited to, disk memory, CD-ROM, optical memory, and the like) containing computer-usable program codes.

The present application is described with reference to flowcharts and/or block diagrams of a method, a device (system), and a computer program product according to the present application. It should be understood that each procedure and/or block of the flowcharts and/or block diagrams, and a combination of procedures and/or blocks in the flowcharts and/or block diagrams, can be implemented by computer program instructions. These computer program instructions may be provided to a processor of a general purpose computer, a dedicated computer, an embedded processor or other programmable data processing devices to produce a machine, such that the instructions executed by the processor of the computer or other programmable data processing devices produce an apparatus for implementing the functions specified in one or more procedures in the flowcharts and/or one or more blocks of block diagrams.

Finally, it should be noted that, the above embodiments are only used to illustrate the technical solutions of the present invention, but not to limit them. Although the present invention has been described in detail with reference to the above embodiments, it should be understood by those skilled in the art that modifications and equivalent substitutions may be made to the embodiments of the present invention without departing from the spirit and scope of the present invention and shall fall within the protection scope of the claims of the present invention.

The invention claimed is:

1. An event-driven accelerator supporting an inhibitory spiking neural network, wherein the event-driven accelerator performs a spiking neural network acceleration method, wherein the spiking neural network acceleration method comprises:

constructing an approximate computation model to eliminate a computation dependency relationship of a spiking neural network at different time steps, the constructing of the approximate computation model comprises:

step 1: collecting all spiking signals in a coarse-grained time period into the same time step;

step 2: computing a membrane voltage gain of a neuron in the coarse-grained time period according to the spiking signals in step 1;

step 3: computing a spiking firing frequency through the membrane voltage gain in step 2; and step 4: obtaining a computation result of the spiking neural network by utilizing the spiking firing frequency in step 3; wherein in step 2, the membrane voltage gain of the neuron in the coarse-grained time period depends on a spiking stimulation intensity brought by a presynaptic neuron in the coarse-grained time period, and a specific computation formula is as follows:

$$\sum_{t=1}^{T'} X_t^j = \sum_{t=1}^{T'} \frac{1}{\tau}\left(\sum_{i=0}^{N} W_{i,j} * S_t^i + \text{leak}\right)$$
$$\approx \frac{1}{\tau}\left(\sum_{i=0}^{N} W_{i,j} * freq_i + \text{leak}\right)$$

wherein, $$X_t^i$$

denotes a membrane voltage gain of a neuron j at time t, $\tau$ denotes a time constant, $W_{i,j}$ denotes a connection weight between a neuron i and the neuron j, $$S_t^i$$

denotes whether the neuron i transmits a spiking signal at time t or not, leak denotes a leak item, and $freq_i$ denotes the spiking firing frequency of the neuron i in the coarse-grained time period;

in step 3, the spiking firing frequency of the neuron is approximately proportional to the membrane voltage gain in the coarse-grained time period, and the membrane voltage gain is divided by a spiking transmission threshold to obtain an approximate spiking firing frequency, and a specific computation formula is as follows:

$$freq_j \sum_{t=1}^{T'} S_t^j \approx \left(\sum_{t=1}^{T'} X_t^j\right)/V_{thrd};$$

wherein, $V_{thrd}$ denotes a spiking firing threshold of a neuron;

the event-driven accelerator comprises hardware circuitry including a spike-input module, a control module, a state module, a compute module, and a spike-output module; wherein the spike-input module comprises a queue implemented by hardware memory for storing spike-input packets, the spike-input packets being composed of a binary group of a neuron label and a spiking activation frequency, and the spike-input module receiving spike-input packets derived from image input data in an external memory and from output data of the spike-output module;

the control module comprises a graph controller and a scheduler; wherein the graph controller comprises a router and on-chip storage that stores, for each neuron, a number of postsynaptic edges and an offset of the postsynaptic edges, the router accessing a Double Data Rate (DDR) synchronous dynamic random access memory that stores a topological structure of the spiking neural network in a Control and Status Register (CSR) mode and, according to neuron labels in the spike-input packets, reading the offset and the number from the on-chip storage and taking out from the Double Data Rate synchronous dynamic random access memory all postsynaptic edges including postsynaptic neurons and corresponding connection weights;

the scheduler comprises hardware scheduling circuitry that receives the postsynaptic neurons and corresponding connection weights from the graph controller and employs a set-associated strategy in which each computation unit is assigned to update a specific set of synaptic neuron states, the scheduler routing relevant data of the postsynaptic neurons to a corresponding computation unit according to the set-associated strategy;

the state module comprises a set of neuron state storage units, wherein each neuron state storage unit stores state information of a set of neurons, the state information comprising membrane potential levels and spiking transmission thresholds;

the compute module comprises a set of neural computation units, wherein each neural computation unit comprises a multiplier-adder and a comparator and is mapped in a one-to-one relationship to a corresponding one of the neuron state storage units so as to read and update the state information of the set of neurons stored in the corresponding neuron state storage unit; when a neural computation unit receives spike input of postsynaptic neurons from the scheduler, the neural computation unit uses the multiplier-adder to update membrane potential levels in the corresponding neuron state storage unit and uses the comparator to compare the updated membrane potential levels with the spiking transmission thresholds to determine neurons for which a spiking signal is to be transmitted;

the spike-output module comprises a set of deduplication queues for writing input packets into different positions according to whether the neurons are output neurons or not, and encapsulating the output neurons into spike-input packets and transmitting the spike-input packets to the spike-input module; wherein the deduplication queue comprises an output queue, a bitmap, and a computation submodule for computing a spiking frequency; wherein the output queue is configured to store all of the neuron labels with a membrane potential level at an intermediate state exceeding a threshold;

the bitmap identifies whether neurons are already present in the output queue to avoid the neurons from being repeatedly pressed into the output queue; and the computation submodule comprises a submodule cal_freq that, when all data in the spike-input module have been processed, reads final membrane voltage states of the neurons corresponding to the neuron labels stored in the output queue, determines whether the neurons in the output queue transmit the spiking signals or not based on the final membrane voltage states, computes frequencies of the spiking signals, and encapsulates the neuron labels and the frequencies into spike-input packets supplied to the spike-input module.

2. The event-driven accelerator according to claim 1, wherein the spike-input packet is of a binary structure and comprises a neuron label and a spiking activation frequency; wherein the neuron label indicates a source of one of the spiking signals; and the spiking activation frequency reflects a number of times that neurons are activated in the coarse-grained time period to realize the support on the approximate computation model.

3. The event-driven accelerator according to claim 2, wherein a computation process of the accelerator supporting the inhibitory spiking neural network is divided into a first stage and a second stage, wherein the first stage is a process of performing a spiking routing and updating the postsynaptic neurons according to the spike-input packet; and the second stage is a process that the spike-output module computes the spiking firing frequency according to a final membrane potential level of the neurons in the output queue.

4. The event-driven accelerator according to claim 1, wherein the neural computation units and the neuron state storage units have a one-to-one mapping relationship, and when the neural computation units receive a spike input of the postsynaptic neurons, the neural computation units read and update the state information of the neurons stored in the neuron state storage unit, and outputs a spike-output packet to a spike-output queue when an updated membrane potential level of a neuron exceeds a corresponding spiking transmission threshold.

5. The event-driven accelerator according to claim 4, wherein a computation process of the accelerator supporting the inhibitory spiking neural network is divided into a first stage and a second stage, wherein the first stage is a process of performing a spiking routing and updating the postsynaptic neurons according to the spike-input packet; and the second stage is a process that the spike-output module computes the spiking firing frequency according to a final membrane potential level of the neurons in the output queue.

6. The event-driven accelerator according to claim 1, wherein each deduplication queue utilizes the bitmap to identify whether the neurons are already present in the output queue to avoid a same neuron from being repeatedly pressed into the output queue, and wherein a transmission time of the spiking signal is delayed and the spiking firing frequency is computed by the computation submodule cal_freq by combining final membrane voltage states of the neurons.

7. The event-driven accelerator according to claim 6, wherein a computation process of the accelerator supporting the inhibitory spiking neural network is divided into a first stage and a second stage, wherein the first stage is a process of performing a spiking routing and updating the postsynaptic neurons according to the spike-input packet; and the second stage is a process that the spike-output module computes the spiking firing frequency according to a final membrane potential level of the neurons in the output queue.

8. The event-driven accelerator according to claim 1, wherein a computation process of the accelerator supporting the inhibitory spiking neural network is divided into a first stage and a second stage, wherein the first stage is a process of performing a spiking routing and updating the postsynaptic neurons according to the spike-input packet; and the second stage is a process that the spike-output module computes the spiking firing frequency according to a final membrane potential level of the neurons in the output queue.

* * * * *